Nov. 1, 1932.   V. P. HENDRICK   1,885,440
FISHING SPOON
Filed Oct. 6, 1931
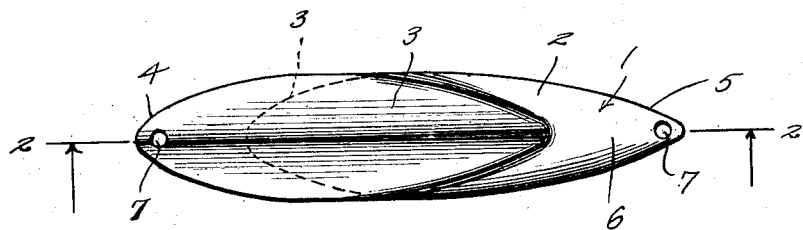
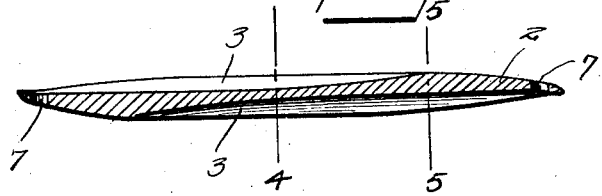
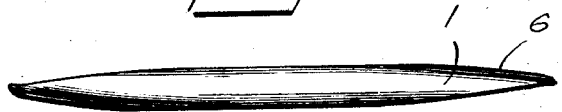
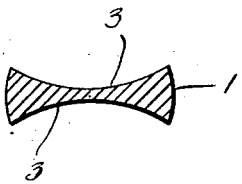
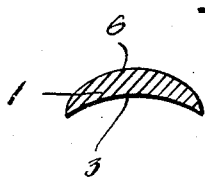
Inventor
V. P. Hendrick
By Watson E. Coleman
Attorney Patented Nov. 1, 1932

1,885,440

UNITED STATES PATENT OFFICE

VICTOR P. HENDRICK, OF MANHATTAN BEACH, CALIFORNIA

FISHING SPOON

Application filed October 6, 1931. Serial No. 567,236.

This invention relates to fishing tackle and pertains particularly to improvements in lures of the type known as spoons.

The primary object of the present invention is to provide a new and novel type of spoon which will be particularly effective in attracting and inducing fish to take a hook attached thereto, through its erratic actions when drawn through the water, which assimilate the movements of a smaller fish or minnow.

Another object of the invention is to provide a novel type of spoon which is of elongated character and which has opposed concave areas upon the side faces, the area on one side being at the opposite end from the opposing area on the opposite side.

A still further object of the invention is to provide a spoon which is of a character to be easily formed and therefore inexpensive to manufacture.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a plan view of the spoon embodying the present invention;

Figure 2 is a longitudinal sectional view taken on the line 2—2 of Figure 1;

Figure 3 is a view in side elevation of the spoon;

Figure 4 is a transverse sectional view taken on the line 4—4 of Figure 2;

Figure 5 is a transverse sectional view taken on the line 5—5 of Figure 2.

Referring now more particularly to the drawing wherein like numerals of reference indicate corresponding parts throughout the several views, the numeral 1 indicates generally the spoon embodying the present invention. The preferred form of the present invention as illustrated comprises an elongated metal body having two broad sides each of which is here indicated by the numeral 2, in each of which is formed the elongated elliptical depression 3 the contour of one end of which defines the edge contour of one end of the body, while the other end of the concave elliptical area terminates inwardly of the opposite end of the body.

The opposing concave elliptical area has one end extended to the said opposite end of the body, while its other end terminates short of the first mentioned end of the body. In other words, the depressed or concave elliptical areas are in end overlapped relation so that their short axes are not in the same plane transversely of the spoon body but are disposed at opposite sides of the transverse center of the body.

As illustrated, one end of the body may converge more sharply than the opposite end so that the more sharply convergent end will appear blunter as indicated at 4, than the opposite end indicated by the numeral 5, which is drawn out more gradually to a point.

Each side face of the body which surrounds or encloses the inner end of the elliptical depression formed therein, is preferably both transversely and longitudinally cambered, as is more clearly shown in Figure 5, the cambered surface being indicated by the numeral 6, and the free or unenclosed end of the concave elliptical area, of course, forms the face of the body opposite this cambered surface as is also shown in Figure 3. A section taken transversely of the body at a point substantially midway between its ends shows both sides to be concave as illustrated in Figure 4.

Each end of the body is provided with an aperture 7 in one of which the fishing line may be engaged while the other aperture is designed to have a hook carrying leader passed therethrough.

While as previously stated the present illustration is a disclosure of the preferred form of the present invention it is to be understood that other forms of body may be employed, the principal feature of the invention residing in the formation and relative disposition of the concave areas in the faces of the body.

Having thus described the invention, what is claimed is:—

1. A fishing spoon comprising an elongated relatively broad body having elongated concave elliptical areas formed in opposed relation in opposite sides thereof, said areas being so disposed relative to one another as to have overlapping ends, and means for attaching a line and a hook to the body.

2. A fishing spoon comprising an elongated relatively broad body having elongated concave elliptical areas formed in opposed relation in opposite sides thereof, said areas being so disposed relative to one another as to have overlapping ends, means for attaching a line and a hook to the body, the contour of the other end of each of said areas defining the edge contour of one end of the body, and means for attaching a line and a hook to the body.

In testimony whereof I hereunto affix my signature.

VICTOR P. HENDRICK.